United States Patent [19]

Hatlestad, II

[11] Patent Number: 5,709,454
[45] Date of Patent: Jan. 20, 1998

[54] VEHICLE VISUAL DISPLAY DEVICES

[76] Inventor: Leif E. Hatlestad, II, 484 Stinchcomb Dr. #2, Columbus, Ohio 43202

[21] Appl. No.: 632,270

[22] Filed: Apr. 15, 1996

[51] Int. Cl.$^6$ ............................................. B60Q 1/00
[52] U.S. Cl. ........................... 362/80; 362/61; 362/101; 362/806; 40/406; 40/556; 428/31
[58] Field of Search ................ 40/406, 441, 556, 40/591; 296/21; 428/31; 362/61, 66, 80, 96, 101, 806, 811

[56] References Cited

U.S. PATENT DOCUMENTS

| | | | |
|---|---|---|---|
| Re. 32,570 | 1/1988 | Conn | 33/379 |
| 3,570,156 | 3/1971 | Walker | 40/406 |
| 3,995,151 | 11/1976 | Nordeen et al. | 362/96 |
| 4,034,493 | 7/1977 | Ball | 40/406 |
| 4,395,835 | 8/1983 | Schneider | 40/406 |
| 4,917,643 | 4/1990 | Hippely et al. | 428/31 |
| 5,029,051 | 7/1991 | Shirai et al. | 362/66 |
| 5,107,407 | 4/1992 | Collot et al. | 362/66 |
| 5,165,781 | 11/1992 | Orak | 362/186 |
| 5,272,816 | 12/1993 | Fujiwara | 33/379 |

*Primary Examiner*—Alan Cariaso
*Attorney, Agent, or Firm*—Philip M. Dunson; Philip J. Pollick

[57] ABSTRACT

Visual display means of a vehicle having a body and force means for producing motion change of the vehicle body comprise a vehicle visual display device on the vehicle body including a container, a first liquid fluid in the container, and a second fluid in the container and essentially immiscible with the first fluid. The vehicle visual display device is responsive to the force means to cause a first fluid-second fluid interface, a first fluid-container interface, and a second fluid-container interface, to change in response to the motion change in the vehicle body. Either the first liquid fluid or the second fluid or both are visible through the container. A plurality of the devices in close proximity, such as side by side, provide the especially interesting and pleasing effects of synchronous change as the motion of the vehicle varies.

17 Claims, 2 Drawing Sheets

VEHICLE VISUAL DISPLAY DEVICES

FIELD

This invention relates to visual display devices on vehicles. It has to do particularly with visual displays so constructed and arranged on the vehicles that the displays are responsive to motion of the vehicles and to changes in the motion. Typically the visual display devices are either integral with the body of the vehicle or attached to it. The visual displays are interesting and pleasing to viewers because of their typical continuing changes in shapes or colors, or both; especially where a plurality of them are located side by side on the vehicle and their changes in appearance occur at least predominantly in synchronism.

BACKGROUND

Of interest in connection with the present invention are the following patents:

U.S. Pat. No. 3,570,156 of Walker, which discloses a transparent or translucent closed glass cylinder containing two immiscible liquids. The cylinder connects to a base at the bottom and a sealed cap on top.

U.S. Pat. No. 3,995,151, Nordeen et at., showing a tube that contains two fluids such as air and water. Connected to the tube are snap tubes that hold lights (e.g., Christmas lights). As air is pumped through the tube by a pump, a visual effect is displayed.

U.S. Pat. No. 4,034,493 of Ball, which describes a long transparent or translucent hour glass shaped chamber with reservoirs at each end. Two immiscible liquids flow from one end of the chamber to the other end when the chamber is inverted. Within the chamber are obstructions that cause one of the liquids to separate into beads.

U.S. Pat. No. 4,395,835, Schneider, which discloses two adjacent transparent sheet-like chambers. One chamber holds three immiscible liquids, two of which are yellow, cyan, or magenta in color. Another chamber holds two liquids, one of which is colored yellow, cyan, or magenta. When the devices are inverted or shaken by the user, a visual rainbow effect is produced.

U.S. Pat. No. 5,165,781 of Orak, describing a flashlight with three cups placed over the light source and connected to the handle of the flashlight. Between each cup and the next is a chamber with two different colored fluids thus producing two chambers with colored fluids. As light is emitted from the flashlight, the fluids receive this light and give off their own colors.

However, none of these patents or any other prior art known to the present inventor teaches or suggests any displays that are responsive to vehicle motion as are the displays in this invention.

DISCLOSURE

The present invention comprises visual display means of a vehicle having a body and force means for producing motion change of the vehicle body. The means typically comprises a vehicle visual display device on the vehicle body and including a container, a first liquid fluid in the container, and a second fluid in the container and essentially immiscible with the first fluid. The vehicle visual display device is responsive to the force means to cause a first fluid-second fluid interface, a first fluid-container interface, and a second fluid-container interface, to change in response to the motion change in the vehicle body. Either the first liquid fluid or the second fluid or both are visible through the container.

Typically the vehicle visual display device is so constructed and arranged on the vehicle as to be either integral with the vehicle body or attached to it either by glue or by tape having adhesive on both sides. Alternatively the vehicle visual display device may be so constructed and arranged on the vehicle as to be either integral with or similarly attached to a vehicle body accessory.

The second fluid in the vehicle visual display device typically comprises a second liquid fluid. Typically the first liquid fluid comprises water, oil, a dye means, ethylene glycol, alcohol or other antifreeze liquid, or a mixture of ethylene glycol and water.

Where the first liquid fluid comprises a mixture of ethylene glycol and water, the said second liquid fluid typically comprises oil, and where the first liquid fluid comprises a first dye means, the second liquid fluid typically comprises a second dye means.

The vehicle visual display device may further comprise illuminating means, such as incandescent for fluorescent or fiber optics means, for illuminating at least a portion of each fluid.

In a typical vehicle visual display device according to the invention, the container comprises a plurality of separate compartments, and typically each separate compartment contains a first liquid fluid and a second fluid. Typically the first liquid fluid in at least one compartment comprises a first dye means of a first color and the first liquid fluid in at least one other compartment comprises a second dye means of a second color.

Where one compartment is located behind another it is at least partially viewable through the fluid or fluids in the other compartment.

A plurality of vehicle visual display devices may be so constructed and arranged as to be attached to the vehicle in a configuration such that the changes of the interfaces of each vehicle visual display device, in response to the motion change in the vehicle body, are essentially identical.

DRAWINGS

CARRYING OUT THE INVENTION

Figure 1:
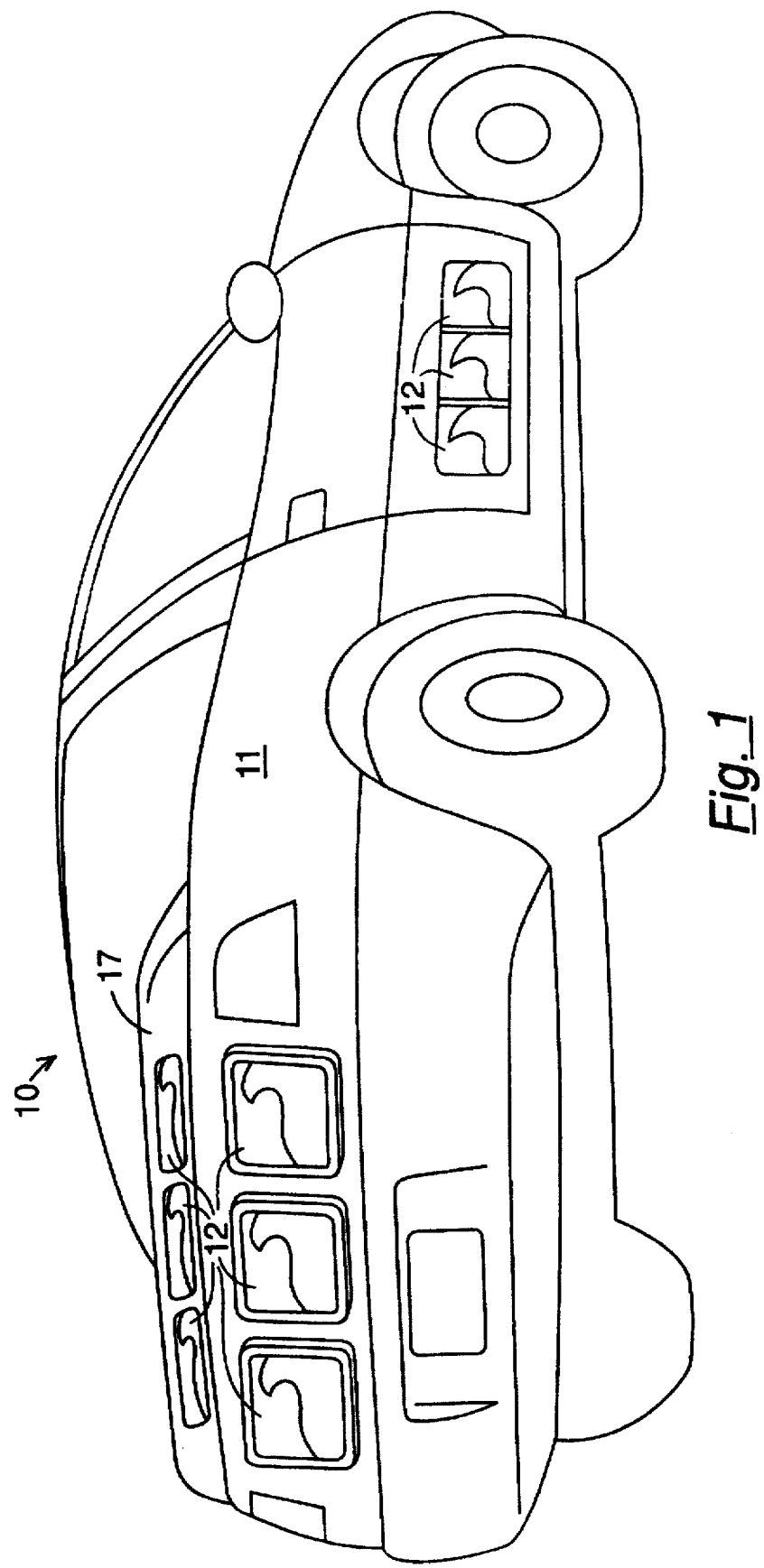
FIG. 1 is a perspective view of a vehicle having on it several typical visual display devices according to the present invention.
Figure 2:
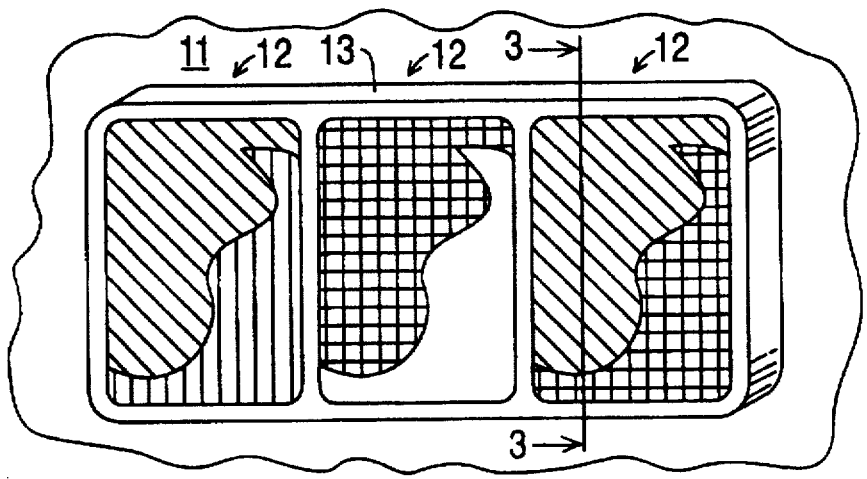
FIG. 2 is a perspective front view of three typical vehicle visual display devices as shown on the side of the vehicle in FIG. 1.

Referring now to the drawings, typical embodiments of the present invention comprise a combination of visual display means with a vehicle 10, as in FIG. 1, having a body 11 and force means (not shown) such as the usual engine and the associated gears that drive either the rear wheels, the front wheels, or all four wheels, brakes and associated braking system, a steering system, and so forth to produce motion and change thereof in the body 11 of the vehicle 10. A wide variety of vehicles are contemplated by the invention including cars, trucks, bicycles, boats, amusement rides, and so forth.

In accordance with the invention, the vehicle visual display means typically comprise at least one vehicle visual display device 12, and typically a plurality of them, on the vehicle body 11.

Figure 3:
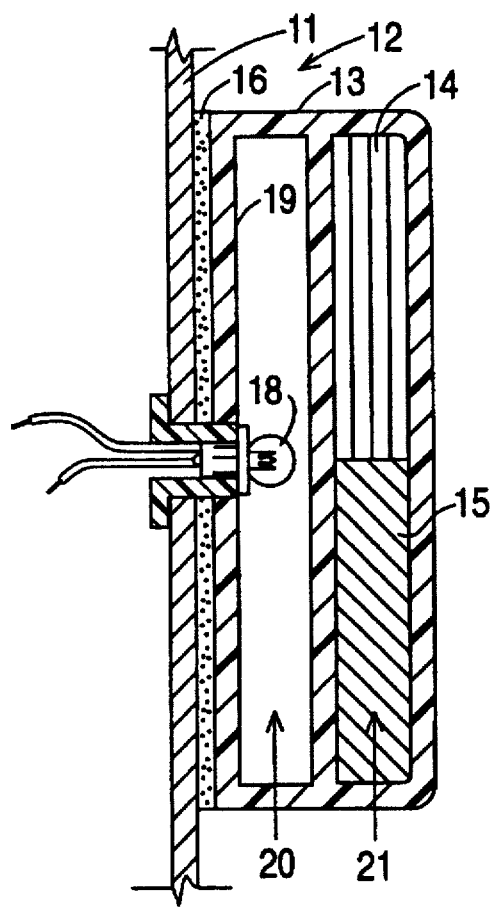
FIG. 3 is a sectional view of a typical vehicle visual display device in FIG. 2 as taken on the plane 3—3.
Figure 4:
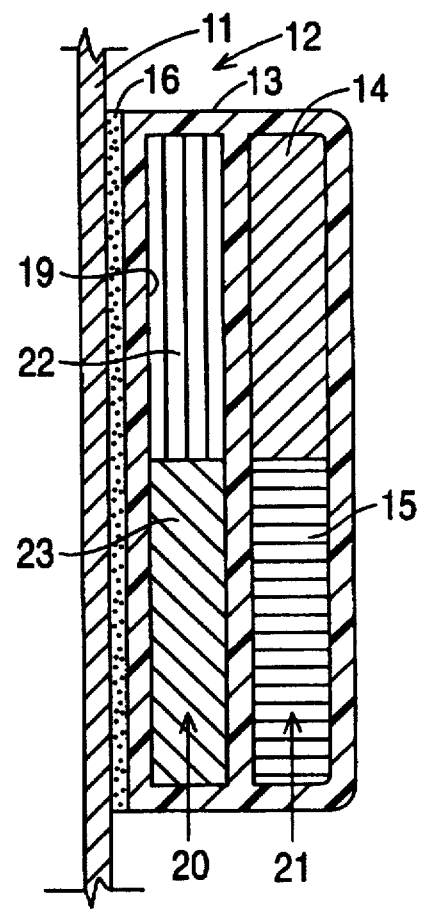
FIG. 4 is a sectional view similar to FIG. 3, and taken in the same plane, showing a typical alternative form of vehicle visual display device according to the invention.

As shown in FIGS. 3 and 4, each typical visual display device 12 comprises a container 13, a first liquid fluid 14 in the container 13, and a second fluid 15 in the container 13; the second fluid 15 being essentially immiscible with the first fluid 14.

Each visual display device 12 is responsive to the force means of the vehicle 11 to cause an interface between the first fluid 14 and the second fluid 15, and an interface between the first fluid 14 and the container 13, as well as an interface between the second fluid 15 and the container 13; to change, typically in shape or other characteristic of appearance, in response to changes in motion of the vehicle body 11. At least one of the fluids 14, 15, and typically both, are visible through the container 13.

Typically each vehicle visual display means 12 is constructed and arranged to be either integral with or attached to the body 11 of the vehicle 10. Where a display means 12 is attached to the vehicle body 11, an attaching means 16 is provided between the vehicle body 11 and the container 13. Typically the attaching means 16 comprises fasteners, glue or tape having adhesive on both sides. In some embodiments of the invention the display means 12 may be either integral with or attached to a vehicle body accessory 17, such as a decorative or traction enhancing member 17, as shown in FIG. 1.

In typical embodiments of the invention the second fluid 15 comprises another liquid, which is different, of course, from the first liquid 14.

In some typical vehicle visual display devices 12 according to the present invention, the first liquid fluid 14 comprises ethylene glycol, alcohol, or other antifreeze liquid, or a mixture of ethylene glycol and water. In others, the first liquid fluid 14 typically comprises water or oil.

In some typical vehicle visual display devices 12, the first liquid fluid 14 comprises a mixture of ethylene glycol and water and the second liquid fluid 15 comprises oil. In others the first liquid fluid 14 comprises a dye, and in such devices the second fluid 15 typically comprises a dye different from the dye in the first liquid fluid 14.

As illustrated in FIG. 3, a vehicle visual display device 12 may include illuminating means 18 for illuminating at least a portion of the first liquid fluid 14 or of the second fluid 15, or of both fluids. The illuminating means 18 typically comprises either incandescent device, as shown in FIG. 3, or a fluorescent material, or a fiber optic device. To increase the illumination from the illumination means 18 as in FIG. 3, the interior back surface 19 in the vehicle visual display device 12 may comprise a highly reflective material. Also in vehicle visual display devices 12 that are not provided with illuminating means 18, as illustrated in FIG. 4, the interior back surface 19 may be provided with highly reflective material to increase the illumination provided externally by daylight or by light from other vehicles or by other ambient light.

In some typical vehicle visual display devices 12, the container 13 may comprise a plurality of compartments; typically two compartments 20,21 as shown in FIGS. 3 and 4.

For convenience, the compartment 20 in the container 13 of FIG. 3 typically does not contain any liquid or other fluid, to avoid leakage if it should because necessary to replace the illuminating means 18.

As shown in FIG. 4, both compartments 20,21 of the container 13 may contain fluids; such as a first fluid 14 and a second fluid 15 in the front compartment 21, and a third fluid 22 and a fourth fluid 23 in the back compartment 20, that differ from the fluids 14,15 in the front compartment 21. Alternatively, the third fluid 22 may be the same as the first fluid 14 or the second fluid 15 and the fourth fluid 23 may be the same as the other fluid 15 or 14 that is in the front compartment 21.

In typical embodiments of the invention a liquid fluid in at least one compartment 20,21 may comprise a dye of one color and a liquid fluid in the other compartment 21,20 may comprises a dye of a different color. Typically the dye in the back compartment 20 of the container 13 is viewable through the dye in the front compartment 21.

In some typical embodiments of the invention, several different fluids may be present in the container 13. For example, in a two compartment container as shown in FIG. 4, all four of the fluids 14,15, 22,23 may be different, or three different fluids may be present, one of which is contained both in the back compartment 20 and in the front compartment 21. Typically the fluids 22,23 in the back compartment 20 are viewable at least partially through the front compartment 21 containing the other fluids 14,15.

Especially interesting and pleasing to their viewers are the effects providing by a plurality of vehicle visual display devices 12 that are so constructed and arranged as to be attached to the vehicle 10 in a configuration such that the changes of the first fluid-second fluid interface, the first fluid-container interface, and the second fluid-container interface of each vehicle visual display device 12, in response to the motion change in the vehicle body 11, is essentially identical. For example, the side by side arrangements of the vehicle visual display devices 12 on the rear and side of the vehicle 10 in FIG. 1 can provide similar display shapes (and, optionally, similar colors or predetermined combinations of different colors) that change synchronously as the motion of the vehicle 10 varies.

While the forms of the invention herein disclosed constitute currently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. Visual display means of a vehicle having a body and force means for producing motion change of said vehicle body, said visual display means comprising A. a vehicle visual display device on said vehicle body and comprising a container, a first liquid fluid in said container, and a second liquid fluid in said container and essentially immiscible with said first fluid;

B. said vehicle visual display device being responsive to said force means to cause a first fluid-second fluid interface, a first fluid-container interface, and a second fluid-container interface, to change in response to said motion change in said vehicle body; and C. at least one of said first liquid fluid and said second fluid being visible through said container;

D. said first liquid fluid comprising a first dye means and said second liquid fluid comprising a second dye means.

2. The vehicle visual display device of claim 1, so constructed and arranged on the vehicle as to be either integral with or attached to said vehicle body.

3. The vehicle visual display device of claim 1, so constructed and arranged on the vehicle as to be attached to said vehicle body either by glue or by tape having adhesive on both sides.

4. The vehicle visual display device of claim 1, so constructed and arranged on the vehicle as to be either integral with or attached to a vehicle body accessory.

5. The vehicle visual display device of claim 1, wherein said first liquid fluid comprises one of ethylene glycol, alcohol, antifreeze liquid, and a mixture of ethylene glycol and water.

6. The vehicle visual display device of claim 1, wherein said first liquid fluid comprises water or oil.

7. The vehicle visual display device of claim 1, wherein said first liquid fluid comprises a mixture of ethylene glycol and water and said second liquid fluid comprises oil.

8. The vehicle visual display device of claim 1, wherein said first liquid fluid comprises a dye means.

9. The vehicle visual display device of claim 1, further comprising illuminating means for illuminating at least a portion of one of said first liquid fluid and said second fluid.

10. The vehicle visual display device of claim 9, wherein said illuminating means comprises one of incandescent means, fluorescent means, and fiber optics means.

11. The vehicle visual display device of claim 1, wherein said container comprises a plurality of separate compartments.

12. The vehicle visual display device of claim 11, wherein each said separate compartment contains a first liquid fluid and a second fluid.

13. Visual display means of a vehicle having a body and force means for producing motion change of said vehicle body, said visual display means comprising
   A. a vehicle visual display device on said vehicle body and comprising a container, a first liquid fluid in said container, and a second liquid fluid in said container and essentially immiscible with said first fluid;
   B. said vehicle visual display device being responsive to said force means to cause a first fluid-second fluid interface, a first fluid-container interface, and a second fluid-container interface, to change in response to said motion change in said vehicle body; and
   C. at least one of said first liquid fluid and said second fluid being visible through said container;
   D. said container comprising a plurality of separate compartments; and
   E. wherein said first liquid fluid in at least one said compartment comprises a first dye means of a first color and said first liquid fluid in at least one other said compartment comprises a second dye means of a second color.

14. The vehicle visual display device of claim 13, wherein said compartment comprising said first dye means of said first color is viewable through said first liquid fluid in said other compartment comprising said second dye means of said second color.

15. Visual display means of a vehicle having a body and force means for producing motion change of said vehicle body, said visual display means comprising
   A. a vehicle visual display device on said vehicle body and comprising a container, a first liquid fluid in said container, and a second liquid fluid in said container and essentially immiscible with said first fluid;
   B. said vehicle visual display device being responsive to said force means to cause a first fluid-second fluid interface, a first fluid-container interface, and a second fluid-container interface, to change in response to said motion change in said vehicle body; and
   C. at least one of said first liquid fluid and said second fluid being visible through said container;
   D. said container comprising a plurality of separate compartments; and
   E. wherein at least one said separate compartment contains said first liquid fluid and said second fluid and at least one said separate compartment contains a third liquid fluid and a fourth fluid.

16. The vehicle visual display device of claim 15, wherein said compartment containing said first liquid fluid and said second fluid is positioned with respect to said other compartment comprising said third liquid fluid and said fourth fluid such that said compartment containing said third liquid fluid and said fourth fluid is viewable at least partially through said other compartment containing said first liquid fluid and said second fluid.

17. A plurality of vehicle visual display devices according to claim 1, so constructed and arranged as to be attached to said vehicle in a configuration such that said change of said first fluid-second fluid interface, said first fluid-container interface, and said second fluid-container interface of each vehicle visual display device, in response to said motion change in said vehicle body, is essentially identical.

* * * * *